United States Patent
Velez et al.

(10) Patent No.: US 7,401,134 B2
(45) Date of Patent: Jul. 15, 2008

(54) PACKET PROCESSING ARCHITECTURE

(75) Inventors: Didier Velez, Carmel, IN (US); Patrick Lopez, Livre S/Changeon (FR); Vincent Demoulin, Pleumeleuc (FR)

(73) Assignee: Thomson Licensing, Boulogne-Billancourt (FR)

( * ) Notice: Subject to any disclaimer, the term of this patent is extended or adjusted under 35 U.S.C. 154(b) by 739 days.

(21) Appl. No.: 10/523,181

(22) PCT Filed: Jul. 25, 2003

(86) PCT No.: PCT/US03/23554

§ 371 (c)(1),
(2), (4) Date: Jan. 28, 2005

(87) PCT Pub. No.: WO2004/012405

PCT Pub. Date: Feb. 5, 2004

(65) Prior Publication Data

US 2006/0031424 A1   Feb. 9, 2006

Related U.S. Application Data

(60) Provisional application No. 60/399,868, filed on Jul. 31, 2002.

(51) Int. Cl.
*G06F 15/177* (2006.01)
*G06F 11/00* (2006.01)

(52) U.S. Cl. ............... 709/221; 370/85.1; 370/421; 370/218; 370/230; 370/230.1; 370/231; 370/389; 714/776; 714/779; 714/780; 340/3.21

(58) Field of Classification Search ........... 370/85.1, 370/421, 218, 230, 230.1, 231, 389; 714/776, 714/779, 780; 340/3.21
See application file for complete search history.

(56) References Cited

U.S. PATENT DOCUMENTS

| 6,085,248 | A | 7/2000 | Sambamurthy et al. |
| 6,564,265 | B2* | 5/2003 | Tillmann et al. ............ 709/246 |
| 6,654,823 | B2* | 11/2003 | Soejima et al. ............... 710/52 |
| 2002/0136217 | A1* | 9/2002 | Christensen ................ 370/393 |
| 2002/0151275 | A1* | 10/2002 | Trost et al. ..................... 455/41 |
| 2005/0141503 | A1* | 6/2005 | Welfeld ........................ 370/392 |

OTHER PUBLICATIONS

W.R. Stevens: "TCP/IP Illustrated, vol. 1", 1994, Addison Wesley, pp. 148-151.
Search Report Dated Dec. 15, 2003.

* cited by examiner

*Primary Examiner*—Nathan J. Flynn
*Assistant Examiner*—Ashok Patel
(74) *Attorney, Agent, or Firm*—Joseph J. Laks; Robert D. Shedd; Reitseng Lin

(57) ABSTRACT

A system for processing data packets comprising a plurality of data processing blocks and a controller, which allows the configuration parameters used in processing the data blocks to be updated in each data processing blocks at the data packet boundary. The present invention involves a system that utilizes a handshaking method for synchronously exchanging data between data processing blocks, wherein the data processing blocks update configuration parameters based on the type of networking standard used. Each data processing block identifies a first data block in the data packet and transmits a first data signal along with a first output data block of the data packet, wherein the block updates the configuration parameters from the controller only when the first data signal is present. In this manner, the first data signal, which is indicative of the data packet boundary, is propagated along the sequence of data processing blocks.

12 Claims, 3 Drawing Sheets

PACKET PROCESSING ARCHITECTURE

This application claims the benefit, under 35 U.S.C. § 365 of International Application PCT/US03/23554, filed Jul. 25, 2003, which was published in accordance with PCT Article 21(2) on Feb. 5, 2004 in English and which claims the benefit of U.S. provisional patent application No. 60/399,868, filed Jul. 31, 2002.

This invention relates to a packet signal processing architecture for processing data packets with a sequence of data processing blocks that use a handshake protocol with configuration changes on packet boundaries, and in particular, to a packet signal processing architecture suitable for processing data packets using different configuration parameters according to different data networking standards in a wireless digital home networking ("WDHN") baseband integrated circuit ("IC").

BACKGROUND OF THE INVENTION

Circuitry for processing data packets within a data networking environment is generally composed of a plurality of data processing blocks that perform specific calculations necessary for processing the data packets in a desired manner. The data processing blocks are often connected in a sequence wherein an input data packet is processed and passed to each subsequent data processing blocks such that processed data packets are propagated through the sequence of data processing blocks.

Data are organized in packets of successive data of fixed or variable size. A data packet is made up of one or more data blocks. Each processing block can process a packet of data in different ways, but all the data are processed the same way within a packet. A set of configuration parameters is applied to each block by a central controller that indicates what kind of processing is to be performed on the packet of data. As the configuration parameter must remain the same for any data block during the processing of a packet, the configuration parameters can only change on the packet boundaries.

The data processing blocks may be reconfigured by applying different configuration parameters in the blocks to adjust the calculations performed within the blocks. This is useful, for example, in a data networking environment using different standards wherein the processing of the data packets must be adjusted in accordance with the standard used.

Also, in a system having a plurality of data processing blocks, it is possible to use a handshaking method of transferring data between the data processing blocks. In such a scheme, each of the data processing blocks are able to provide and receive a ready to send (RTS) signal, which signifies that the block is ready to send a data block, and a ready to receive (RTR) signal, which signifies that the block is ready to receive a data block. A data transfer is performed synchronously between two data processing blocks when the both signals are present, that is, the sender provides a RTS signal and the receiver sends a RTR signal, on the rising edge of the clock.

In a system that utilizes a chain of data processing blocks that receives configuration parameters from a controller to determine what kind of processing is to be performed on the data packets, and also utilizes the handshaking scheme for exchanging data packets, a problem may exist in ensuring that the proper configuration parameters are being utilized by the data processing blocks. In this regard, it may be the case that the number of input bytes is not necessarily the same as the number of output bytes. Since the handshaking scheme is used to exchange the data packets, the time when the first data of a packet is processed by a particular data processing block may vary. The time may be different for each block because the arrival of the first data block of the data packet may not be the same for all. It depends on whether the block is ready to process data, and whether the preceding block is ready to pass data. In this environment, the controller, which provides the configuration parameters for the blocks, does not know when each block receives the first data block of the data packet and needs to have the configuration parameters updated. Therefore, it is desirable to provide a system that ensures that the configuration parameters are updated in the data processing blocks at the proper time to overcome the above.

SUMMARY OF THE INVENTION

The present invention overcomes the problems noted above by providing a packet signal processing architecture wherein the data processing blocks in the system are able to recognize the data packet boundaries and change the configuration data only on the data packet boundaries. The present invention is particularly suitable for use in data processing systems that must be reconfigurable to process data packets according to various data networking standards.

In one aspect, the invention is a system for processing data packets comprising a plurality of data blocks, comprising: a controller; and a plurality of data processing blocks connected in a sequence, each data processing block also connected to the controller for receiving respective configuration parameters from the controller, the configuration parameters being used for controlling the processing of the data blocks within each respective data processing block, wherein each data processing block transmits a first data signal along with a first output data block associated with a particular data packet to a subsequent data processing block in the sequence, wherein the first data signal is propagated through the sequence of data processing blocks with the first output data block, and each data processing block changes to new configuration parameters upon receipt of the first data signal from a previous data processing block in the sequence, whereby the configuration parameters are only changed on a data packet boundary. The data blocks may be transferred between the data processing blocks using a handshaking method, that is, when a Ready to Send signal and Ready to Receive signal are set. The configuration parameters may include a first signal that indicates the number of data blocks within a data packet, and a first data processing block may send a second signal to the controller after processing the last data block of a data packet. The last data processing block sends a third signal to the controller upon receiving the first data signal indicating that the controller may update the configuration parameters for the next data packet. The controller sends a fourth signal to the first data processing block upon receiving the second and third signals indicating that the first data processing block may begin processing the next data packet.

In another aspect, the invention is a method, in a system comprising a plurality of data processing blocks connected in a sequence, each data processing block also connected to a controller for receiving respective configuration parameters from the controller, for processing data packets comprising the steps of: identifying, in each data processing block, a first data block associated with a particular data packet; reading new configuration parameters from the controller in response to the identifying step; performing data processing utilizing the configuration parameters read from the controller; and transmitting a first data signal along with a first output data block associated with the particular data packet whereby the configuration parameters are changed in the data processing blocks at a data packet boundary. The method may utilize a handshaking method for transferring data blocks between the data processing blocks. The method may further include providing to the first data processing block a first signal indicative of the number of data blocks in the data packet, wherein the first data processing block sends to the controller a second signal that indicates that it has processed the last data block of a particular data packet. The method may further include providing, by the last data processing block, to the controller a third signal upon receipt of the first data signal indicating that the controller may update the configuration parameters for the next data packet. The controller sends a fourth signal to the first data processing block upon receipt of the second and third signals, indicating that the first data processing block may start processing the next data packet.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DETAILED DESCRIPTION

Figure 1:
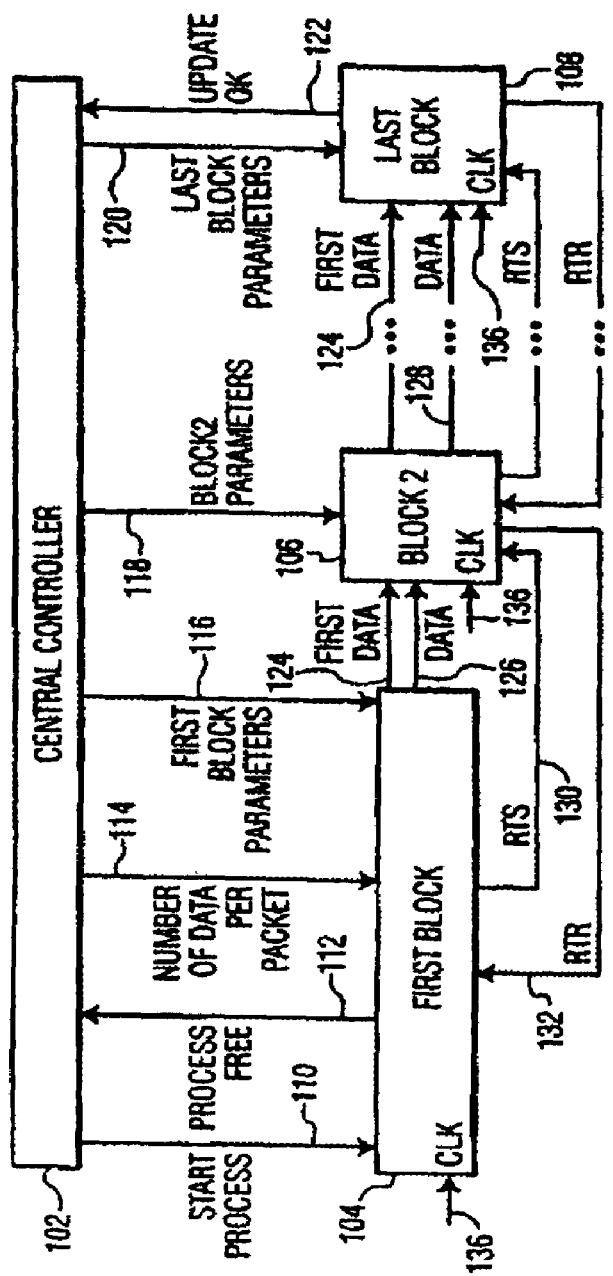
FIG. 1 shows a block diagram of a system for processing a data packet in accordance with the present invention.

A system 100 utilizing data processing architecture according to the present invention is shown in FIG. 1.

System 100 includes a plurality of data processing blocks, including first block 104, second block 106 and last block 108, coupled in series. It is to be understood that any number of data processing blocks may be coupled in series when implementing the present invention, wherein each processing block includes the RTS signal line 130, RTR signal line 132, first data signal line 124, data line(s) and configuration parameter line(s). System 100 may be included, for example, as a part of a physical layer circuitry in a wireless home networking IC that is adapted to process data according to one or more wireless data networking standards. Each data processing block receives a block of data, performs the necessary processing and sends an output data block to a subsequent data processing block in the sequence. The number of output data blocks may or may not correspond to the number of input data blocks. For example, a single input data block may result in one or more output data blocks being generated. However, in any case, the first data signal is transmitted with the first output data block associated with the data packet.

The data blocks are synchronously transferred between the data processing blocks using handshaking. In this regard, each data processing block is coupled to a previous data processing block and a subsequent data processing block in the series by a ready to send (RTS) signal line 130 and ready to receive (RTR) signal line 132. A data block is transferred between a transmitting block and a receiving block one the rising edge of a clock signal when both the RTS and RTR signals are present.

The data blocks are transmitted between the data processing blocks via data lines 126 and 128. The data processing blocks receive the configuration parameters via respective parameter signal lines 116, 118 and 120.

The operation of system 100 in processing a data packet that comprises a number of data blocks is as follows. Initially, central controller 102 determines the type of packet to be processed and the configuration parameters required to be used by data processing blocks 104, 106 and 108 in order to process the data packet. Central controller 102 may determine the packet type and the configuration parameters using any method, and the type of method used is not essential to the present invention. These configuration parameters are placed in buffers of central controller 102 prior to the data blocks actually being transmitted through the sequence of data processing blocks. The parameters may be placed in any other memory location accessible by the data processing blocks.

When the data processing blocks have sufficiently completed processing of a prior data packet and the first data block of the next data packet is ready to be processed, central controller 102 sends a start process signal via signal line 1 10 to first data processing block 104 to indicate that processing of the first data block of the new data packet may begin. At this point first block reads the new configuration parameters from central controller 102 and uses the configuration parameters to generate one or more output data blocks. As first block 104 is ready to transmit the first output data block associated with the first input data block to second block 106, first block 104 generates a RTS signal on line 130. When RTR signal is set on line 132 by block 106, data transfer may occur. When the first data output block is transferred from first block 104 to second block 106, first block 104 also sets a first data signal on line 124 to indicate that the transferred data block is the first output data block of the new data packet.

When the first data signal is set during the data transfer, second block 106 knows that the received data block is the first output data block of the data packet, and thus, is a packet boundary. Upon receiving the first data signal with the data block, second block 106 reads the new configuration parameters from central controller 102 via line 118 and performs the required processing using the new configuration parameters. The configuration parameters may be unique for each data processing block. As before, second block 106 generates and transmits to the subsequent processing block in the sequence the first data signal along with the first output data block generated by second block 106. The data blocks are thus processed along the sequence of data processing blocks and the first data signal is passed through the sequence.

When the first data signal is received by last block 108 and last block 108 has read the new configuration parameters, last block 108 generates and sends to central controller an update OK signal on line 122 to indicate to central controller 102 that central controller 102 may update the configuration parameters in the buffer for the next data packet. In this manner, the configuration parameters are updated in central controller 102 at the data packet boundaries. The configuration parameters may be updated in central controller when the first data signal reaches last block 108 because at that point all of the data processing blocks have read the required configuration parameters for the data packet being processed.

For the next data packet, central controller 102 generates the start process signal when the new data packet is ready to be transmitted to first block 104, central controller 102 has received the process free signal indicating that first block 104 has completed processing the last data block of the previous data packet, central controller 102 has received the update OK signal indicating that last block 108 has received the first data signal indicating that the previous configuration parameters have been loaded into all of the data processing blocks, and central controller 102 has loaded the new configuration parameters into its buffer.

Figure 2:
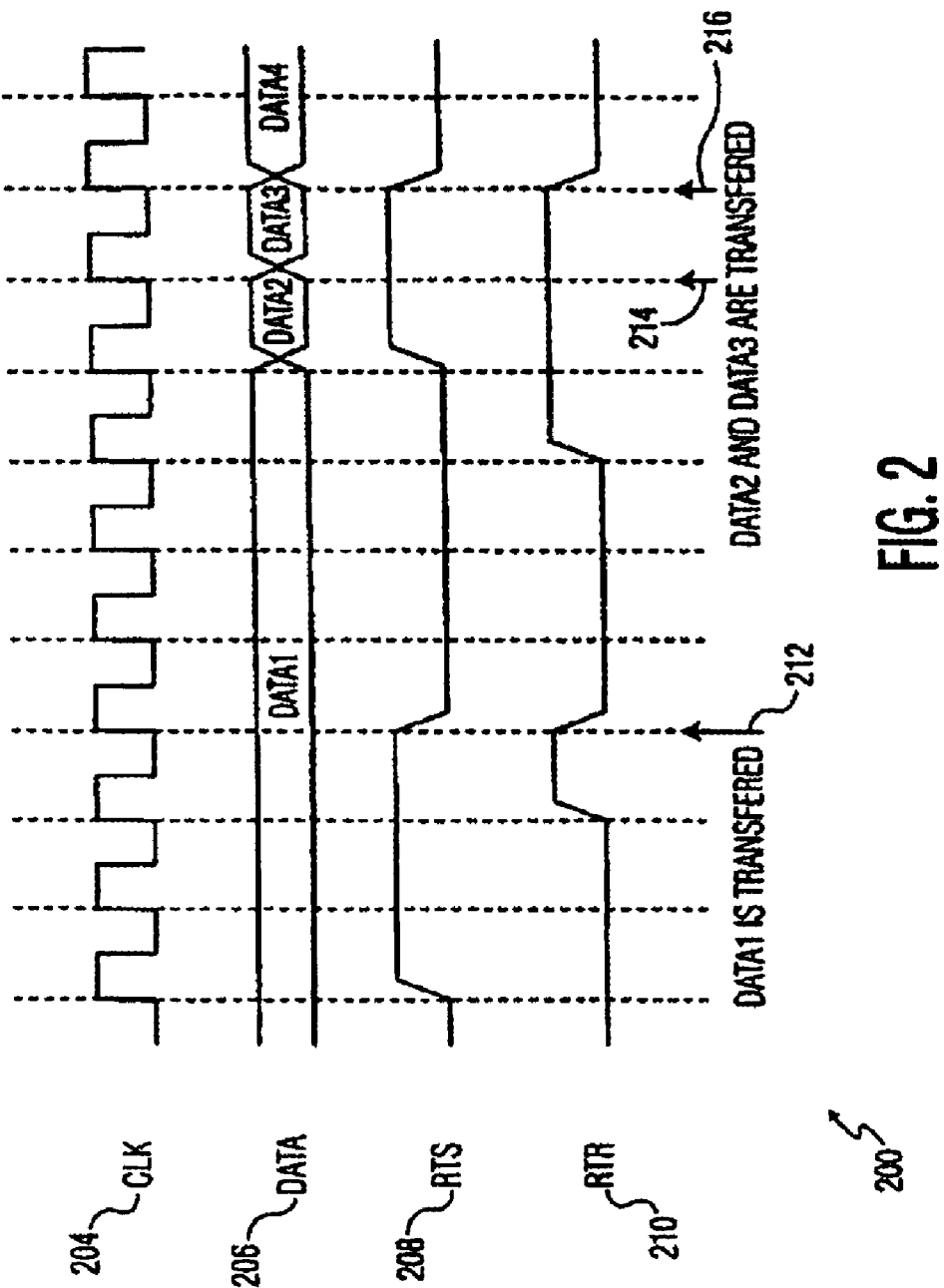
FIG. 2 shows a timing diagram illustrating the synchronous transfer of data between data processing blocks.

The synchronous transfer of data between the data processing blocks is shown in the timing diagram of FIG. 2. As shown in FIG. 2, the data is transferred when the both the RTS and RTR signals are set and on the rising edge of clock signal 204. Illustratively, data 1 is transferred at point 212, data 2 is transferred at point 214 and data 3 is transferred at point 216. The data may comprise one or more bits, which may be transferred via a data bus.

Figure 3:
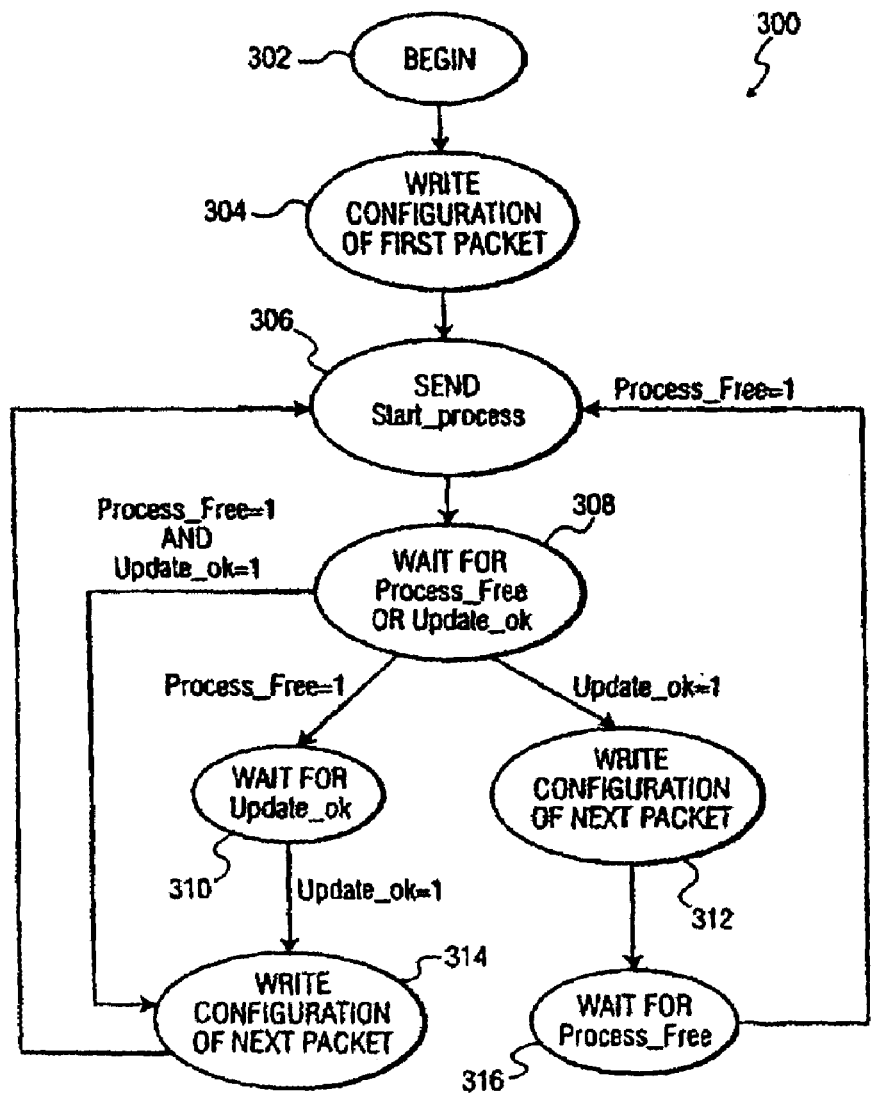
FIG. 3 shows a state diagram illustrating the operation of the system in accordance with the present invention.

FIG. 3 shows a state diagram illustrating the operation of system 100. The operation begins in step 302 where it is assumed that central controller 102 has determined the type of data packet to be processed and the configuration parameters associated with the data packet, and the data packet is ready to be transmitted to first block 104. In step 304, the configuration parameters are written to the buffers of central controller 102. In step 306, central controller 102 generates and transmits the start process signal to first block 104 indicating that the configuration parameters have been loaded into the buffer and processing may begin.

Following step 306, processing is performed on the data packet along the sequence of data processing blocks 104 to 108 and central controller 102 waits for the status signals from the processing blocks. In step 308, it is determined whether the process free signal or the update OK signal is present. If the process free signal and the update OK signal are present, the first output data block of the data packet has reached last block 108 and first block 104 has processed the last data block of the data packet. In that case, central controller 102 writes the new configuration parameters for the next data packet in step 314, and then returns to step 306 to indicate that the processing of the next data packet may begin. If the process free signal is set, but the update OK signal is not, the last data block of the packet has been processed by first block 104, but the first output data block of the packet has not yet reached last block 108. In that case, the configuration parameters cannot be updated, and central controller 102 must wait until the update OK signal is received in step 310 before writing the configuration parameters for the next packet in step 314. If the update OK signal is set, but the process free signal is not, the first output data block of the packet has reached last block 108, but the last data block of the packet has not been processed by first block 104. In this case, the configuration parameters can be updated for the next data packet in step 312, since all of the data processing blocks in the sequence have read the configuration parameters associated with the current data packet. The operation waits for the process free signal to be received in step 316 before generating and sending the start process signal in step 306.

The present invention may be used in any application that includes a plurality of data processing blocks connected in sequence, wherein the data processing blocks synchronously transfer the data blocks and process the incoming data packets in accordance with configuration parameters that must be dynamically changed depending on the type of data packets. The present invention is particularly useful in a physical layer circuitry of a network interface system that is capable of processing data packets according to differing data standards, for example, IEEE 802.11a and Hiperlan 2. In that case, the type of processing performed by each data processing block differs based on the type of standard being used. On the transmitting side, the data processing blocks that may require dynamic configuration parameter updating may include, for example, a data FIFO and pseudo random bit sequence ("PRBS") generator block, a scrambler, a convolutive encoder, a puncturer, an interleaver, a mapper and a pilot insertion block. On the receiving side, the data processing blocks that may require dynamic configuration parameter updating may include, for example, an equalizer, demapper, depuncturer, viterbi decoder, descrambler, and a bit error rate ("BER") computation unit. These blocks are connected in sequence and to a controller for receiving the configuration parameter. The functions of these blocks as well as the configuration parameters utilized to adjust the performance of these blocks are generally known to those skilled in the art. Using the invention as described above, these data processing blocks may be adapted to dynamically change the configuration parameters on the data packet boundaries as desired.

While this invention has been described as having a preferred design, the present invention can be further modified within the spirit and scope of this disclosure. This application is therefore intended to cover any variations, uses, or adaptations of the invention using its general principles.

We claim:

1. A system for processing data packets comprising a plurality of data blocks, the system comprising:
  a controller; and
  a plurality of data processing blocks connected in a sequence, each data processing block also connected to the controller for receiving respective configuration parameters from the controller, the configuration parameters being used for controlling the processing of the data blocks within each respective data processing block, wherein
  each data processing block receives an input data block and provides an output data block utilizing a handshaking protocol using a ready to receive signal to signify that the data processing block is ready to receive a data block and a ready to send signal to signify that the data processing block is ready to send the data block, and a data block is transferred between a pair of data processing blocks when both the ready to receive and ready to send signals are set between the pair of data processing blocks, each data processing block transmits a first data signal along with a first output data block associated with a particular data packet to a subsequent data processing block in the sequence, wherein the first data signal is propagated through the sequence of data processing blocks with the first output data block, and each data processing block changes to new configuration parameters upon receipt of the first data signal from a previous data processing block in the sequence, wherein the configuration parameters are changed only at a data packet boundary.

2. The system of claim 1, wherein the controller provides to a first data processing block in the sequence a first signal representative of the number of data blocks within a data packet.

3. The system of claim 2, wherein the first data processing block identifies a first data block in a subsequent data packet in response to the first signal.

4. The system of claim 3, wherein the first data processing block provides a second signal to the controller in response to processing a last data block in the data packet, the second signal indicating that the data packet has been completely processed by the first data processing block and a new data packet can be loaded into the first data processing block.

5. The system of claim 4, wherein a last data processing block in the sequence provides to the controller a third signal in response to receiving the first data signal from a previous data processing block, the third signal indicating that a first data blocks of the data packet has been processed by all of the data processing blocks in the sequence and that the controller can update the configuration parameters in the data processing blocks.

6. The system of claim 5, wherein the controller provides to the first data processing block a fourth signal to indicate that processing of the data packet may start in response to the presence of the second and third signals.

7. The system of claim 1, wherein one of the data processing blocks receives the first data signal and an input data block, processes the input data block and provides a plurality of output data blocks, and provides the first data signal only with the first one of the output data blocks to a subsequent data processing block.

8. In a system comprising a plurality of data processing blocks connected in a sequence, each data processing block also connected to a controller for receiving respective configuration parameters from the controller, the configuration parameters being used for controlling the processing of the data blocks within each respective data processing block, a method for processing data packets comprising the steps of:
    identifying, in each data processing block, a first data block associated with a particular data packet;
    reading new configuration parameters from the controller in response to the identifying step;
    performing data processing utilizing the configuration parameters read from the controller;
    providing, by one data processing block, a ready to receive signal when the one data processing block is ready to receive a data block and a ready to send signal when the one data processing block is ready to send a data block, wherein a data block is transmitted between a pair of data processing blocks when both the ready to receive signal and the ready to send signal are present between the pair of data processing blocks; and
    transmitting a first data signal along with a first output data block associated with the particular data packet wherein the first data signal is propagated through the sequence of data processing blocks with the first output data block, and each data processing block changes to new configuration parameters upon receipt of the first data signal from a previous data processing block in the sequence, wherein the configuration parameters are changed in the data processing blocks only at a data packet boundary.

9. The method according to claim 8, further comprising the step of
    providing, by the controller, to a first data processing block in the sequence a first signal representative of the number of data blocks within a data packet, wherein the first data processing block identifies a first data block in a subsequent data packet in response to the first signal.

10. The method according to claim 9, further comprising the step of
    providing, by the first data processing block in the sequence, to the controller a second signal in response to processing a last data block in the data packet, the second signal indicating that the data packet has been completely processed by the first data processing block and a new data packet can be loaded into the first data processing block.

11. The method according to claim 10, further comprising the step of
    providing, by a last data processing block in the sequence, to the controller a third signal in response to the receipt of the first data signal by the last data processing block, the third signal indicating that a first data block of the data packet has been processed by all of the data processing blocks in the sequence, the controller updating the configuration parameters in response to receipt of the third signal.

12. The method according to claim 11, further comprising the step of
    providing, by the controller, to the first data processing block a fourth signal in response to the receipt of the second and third signals, the fourth signal indicating that the first data processing block may start processing a next data packet.

* * * * *